(12) United States Patent
Eugene

(10) Patent No.: US 7,067,607 B2
(45) Date of Patent: Jun. 27, 2006

(54) POLYURETHANE RESIN DERIVED FROM HYDROPHILIC POLYOL COMPONENTS

(75) Inventor: Denis Eugene, La Roche sur Foron (FR)

(73) Assignee: SICPA Holding S.A., Prilly (CH)

( * ) Notice: Subject to any disclaimer, the term of this patent is extended or adjusted under 35 U.S.C. 154(b) by 87 days.

(21) Appl. No.: 10/382,465

(22) Filed: Mar. 6, 2003

(65) Prior Publication Data
US 2003/0204039 A1    Oct. 30, 2003

(30) Foreign Application Priority Data
Apr. 25, 2002    (EP)    ................... 02009425

(51) Int. Cl.
*C08G 18/48*    (2006.01)
(52) U.S. Cl. ............................ 528/76; 528/49; 528/61; 528/77; 106/31.13; 156/277; 428/423.1
(58) Field of Classification Search ................. 528/76, 528/77, 49, 61; 106/31.13; 156/277; 428/423.1
See application file for complete search history.

(56) References Cited

U.S. PATENT DOCUMENTS 5,654,390 A    8/1997 Gajewski et al.

FOREIGN PATENT DOCUMENTS

EP    0604890    7/1994
WO    WO 01 14442    3/2001

OTHER PUBLICATIONS

McGraw Hill Dictionaryof Scietific and Technical Terms; Fifth Edition; 1994; p. 696.*
Römpp Lexikon, Lacke und Druckfarben, ed. U.Zorll, Georg Thieme Verlag, Stuttgart, New York 1998, p. 214 and 318.
Database WPI, Section Ch, Week 198945, Derwent Publication Ltd., London GB; Class A25, AN1989-322740 XP002153577 & JP 01 242674 A (Kuraray Co Ltd), Sep. 27, 1989 *abstract*.

* cited by examiner

*Primary Examiner*—Rachel Gorr
(74) *Attorney, Agent, or Firm*—Shoemaker and Mattare

(57)    ABSTRACT

A polyurethane resin which is the reaction product of at least one diisocyanate and a group of components having isocyanate reactive functional groups. The group of components includes a first group of one or more polyether polyols each having an average molecular weight in the range of 1000 to 10000 g/mol, a second group of one or more polyether polyols each having an average molecular weight in the range of 400 to 10000 g/mol and being hydrophilic and water-soluble, a third group of one or more polyols each having an average molecular weight equal to or less than 800 g/mol, at least one amine, and a reaction terminating agent. The ratio of the equivalent weights of the diisocyanate to the components having isocyanate reactive functional groups is selected such that essentially all of the isocyanate groups of the diisocyanate are present only as the reaction product with one of said isocyanate reactive functional groups.

18 Claims, No Drawings

POLYURETHANE RESIN DERIVED FROM HYDROPHILIC POLYOL COMPONENTS

BACKGROUND OF THE INVENTION

The present invention relates to a polyurethane resin, to a coating composition comprising the polyurethane resin, to the use of the polyurethane resin for printing plastic substrates, to a method of producing a polyurethane resin and to a method of producing a laminate carrying a printed image.

Polyurethane resins are the binders of choice in solvent borne coating compositions for plastic films and in the production of image carrying laminates. Laminates are multilayered shaped articles in which—according to the needs of the final article—each of the layers consists either of the same or of different materials. The preferred materials are paper, wood, textiles, metal and plastic films. In the field of food packaging, the laminates are made mostly from plastic or metal films, in particular, metallized films, or a combination of both. Film materials are chosen such that the laminates can be subjected to sterilization processes without deterioriation of the film and/or the laminate. As a further advantage laminates impart to prints or, generally, images a satisfying appearance with respect to gloss and color fastness. Generally, laminates are produced by either joining two or more layers by means of adhesives or by adhesive-free extrusion coating. Irrespective of the production process a print or generally any kind of image which does not necessarily have to be printed can be applied to one or both of the layers prior to applying the next layer (Römpp Lexikon, Lacke und Druckfarben, ed. U. Zorll, Georg Thieme Verlag, Stuttgart, New York 1998, p.214 and 318).

Coating compositions for laminates, which are mainly in the form of printing inks, have to satisfy high standards. The resin as the film forming part of the composition must provide the dried layer with the required adhesive strength both to the underlying substrate and to the adhesive or to the extruded layer. As a further requirement the resin must impart to the dried layer stability during and after sterilization processes and/or treatment in boiling water even over a prolonged period of time (e.g. during food preparation). Further the dried layer must show blocking resistance and stability during sealing of the laminate (e.g. in the production of bags). The composition—as a printing ink—must be printable in flexo and gravure printing processes which are the techniques commonly used for printing plastic films. Thus, the resin must allow the printing ink to be thinly liquid, rapidly drying and to be soluble in esters and in alcohols, in particular in ethanol.

EP-604 890 teaches a printing ink (for printing laminates) based on a polyurethane resin. The polyurethane resin is the reaction product of a high molecular weight polyol compound of a molecular weight in the range of 3000 to 10000, a low molecular weight polyol compound of a molecular weight of less than 200, an organic diisocyanate compound, a chain extender and optionally a reaction terminating agent. The polyol compounds are chosen such that the whole of the high molecular weight polyol compound and the low molecular weight polyol compound has an average molecular weight in the range of 1500 and 2700, the isocyanate index of the diisocyanate being more than 2.0 and the nitrogen content of the polyurethane resin derived from the isocyanate groups of the diisocyanate being from 1.3 to 1.95% by weight. Only standard polyether polyols such as polyethylene glycol are used. Furthermore, the importance of the selected molecular weight range of the polyol component is stressed in that by using a polyol component having a lesser molecular weight an ink having poor adhesiveness and adaptability for boiling or retorting treatment is obtained.

Whereas printed and dried layers produced with the ink of EP-604 890 show in most of the cases the required bond strength, the initial adhesiveness of the layers to the underlying substrate, i.e. the adhesiveness within the first 30 seconds after drying, is poor. A lack of initial adhesiveness results in at least partial transfer of the printed layers to the back side of the substrate/film to which the layer has been applied during storage on rollers or stacks. A further drawback of the prints/layers produced with the ink of EP 604 890 is their lack of heat resistance in particular on coextruded polypropylene and polyester. The latter results in damages on edges of the layers during heat treatment of the laminate. In addition the printing ink shows poor compatibility with alcohols as the solvent of choice in flexographic applications. All these drawbacks are mainly due to lack of performance of the polyurethane resin.

SUMMARY OF THE INVENTION

It is an object of the present invention to provide polyurethane resins applicable as film forming binders in coating compositions showing a good initial adhesiveness and a good compatibility with alcohols as well as a good heat resistance, so that—in the broadest sense—any kind of dried layers on plastic films and/or laminates can be obtained, these layers thus having an excellent initial adhesiveness in particular so that the layer is not damaged during storing and further processing of the substrate/film and during finishing of the laminate. In particular, the risk of delamination during sealing of the plastic film or laminate is reduced.

The above object is solved according to the present invention by a polyurethane resin being the reaction product of at least one diIsocyanate and a group of components having isocyanate reactive functional groups, the group of components comprising:

a first group of one or more polyether polyols each having an average molecular weight in the range of 1000 to 10000 g/mol, a second group of one or more polyether polyols each having an average molecular weight in the range of 400 to 10000 g/mol and being hydrophilic and/or water-soluble, a third group of one or more polyols each having an average molecular weight equal to or less than 800 g/mol, and at least one amine and a reaction terminating agent, wherein the ratio of the number of equivalent weights of the diisocyanate to the components having isocyanate reactive functional groups is selected such that essentially all of the isocyanate groups of the diisocyanate are present as the reaction product with one of the isocyanate reactive functional groups.

It has been found that the polyurethane resins of the present invention are especially suitable for use with waterborne adhesives such as aqueous reactive 2-component laminating adhesives or 2-component laminating adhesives.

According to the present invention, definitions of ranges are intended to include the boundaries of those ranges. For example, a molecular weight range of from 2000 to 3000 g/mol shall also mean to include compounds having an average molecular weight of 2000 g/mol and of 3000 g/mol.

The polyurethane resin of the present invention has a weight average molecular weight of 10000 to 80000 g/mol, preferably 35000 to 55000 g/mol and is soluble in organic solvents which comprise alcohols such as ethanol and ethyl acetate.

In a preferred embodiment the polyurethane resin of the present invention has a urethanization of 10 to 20%.

The favourable properties of the polyurethane resin with regard to its binder qualities in coatings can be influenced by a series of equivalent weight ratios between the reactants. It is to be understood that all the ratios listed hereinafter merely represent embodiments adapted to meet diverse needs of the resin:

According to a preferred embodiment of the present invention, the ratio of the number of equivalent weights of the diisocyanate to the entirety of the polyether polyols of the first group to third group is in a range of 3.6:1 to 1:1, preferably 1.5:1.

According to another preferred embodiment of the present invention, the ratio of the number of equivalent weights of the diisocyanate to the components having isocyanate reactive functional groups is preferably in a range of 0.95:1 to 1.2:1, more preferably 1:1 to 1.1:1.

According to another preferred embodiment of the present invention, the ratio of the number of equivalent weights of the sum of the polyether polyols of the first group and of the second group to the polyols of the third group is in the range of 1:1 to 5:1, preferably in a range of 3:1 to 5:1.

According to another preferred embodiment of the present invention, the ratio of the number of equivalent weights of the diisocyanate to the amine is in a range of 3:1 to 6:1, preferably in a range of 3:1 to 5:1.

In a preferred embodiment the diisocyanates are selected from the groups consisting of isophorone-diisocyanate (IPDI), 4,4'-diisocyanato-diphenylmethane (MDI), hexamethylene-diisocyanate (HMDI) dicyclohexylmethane diisocyanate and toluol-diisocyanate (TDI). In particular the IPDI is either used alone or in a mixture with MDI. In a further preferred embodiment even polyisocyanate resins are applicable. However, it is to be understood that any diisocyanate commonly used in the synthesis of polyurethane resins can be applied for the purpose of the present invention.

As components having isocyanate reactive functional groups only those components are applied which contain hydroxy and/or amine groups. Although aminoalcohols (compounds containing hydroxy and amine groups) are not excluded from the present invention, pure components, i.e. components which have either hydroxy or amine groups as the only isocyanate reactive functional groups are preferred.

The polyether polyols of the first group are preferably selected from the group consisting of dihydroxy- and trihydroxy polyether polyols having an average molecular weight of from 1000 to 10000 g/mol, for example with a hydroxy value in a range of 11.2 and 112.2 mg KOH/g. Polyoxyalkylene glycols such as Polypropylene glycol (PPG) or Polytetrahydrofurane (poly(THF)) are the most preferred dihydroxy polyether polyols. Poly(THF) has worked out to be the most suitable polyoxyalkylene glycol in the synthesis of the polyurethane resin of the present invention. Further preferred as dihydroxy polyether polyol is a polycaprolactone based polyether. However, also polyols based on triols or even higher functional polyols as monomers such as glycerin, trimethylolpropane, pentaerythrithol, sorbitol, trimethyloletane or 1,2,3-butanetriol are suitable for the purpose of the present invention.

The polyether polyols of the second group are for example diols, triols or tetrols which are so hydrophilic that they show good affinity to water or water-solubility and have an average molecular weight of from 400 to 10000 g/mol, preferably 400 to 6000 g/mol. Suitable polyether polyols showing such characteristics are for example compounds showing a hydroxy value of less than 280 mg KOH/g for diols and less than 420 mg KOH/g for triols and less than 560 mgKOH/g for tetrols. Examples are alkoxylated, preferably ethoxylated pentaerythritol, for example PP150 sold by Perstorp; TP200 (ethoxylated trimethylolpropane) sold by Perstorp; copolymers of ethylene oxide and propylene oxide which are sold under the trade name Pluronic PE by BASF, wherein copolymers having a polyethyleneglycol content of at least 30% are preferred; ethoxylated sorbitol such as Imbentin-SOR/200 sold by Kolb AG, Germany, or a polyethylenglycol sorbitan perisostearate such as Sympatens-SIS/400 sold by Kolb, Germany. Further examples are alkoxylated, preferably ethoxylated bisphenol A, alkoxylated, preferably ethoxylated NPG, alkoxylated, preferably ethoxylated TNP or additionally alkoxylated, preferably ethoxylated PETA. A particularly useful example is a polymer obtained from ethoxylating trimethyolpropane with ethylene oxide, wherein the ratio of trimethylolpropane to ethylene oxide is from 1:10 to 1:50.

The polyols of the third group are preferably selected from the group consisting of monomeric diols, such as neopentyl glycol, hexane diol or 1.4 butanediol, dihydroxy polyether polyols such as polypropylene glycol, polyester polyols, hard ketonic resins having preferably a hydroxy value of at least 280 mg KOH/g but not more than 500 mg KOH/g. In a preferred embodiment the hard ketonic resin is the hydrogenated condensation product of a formaldehyde and an aliphatic and/or aromatic ketone. The polyester polyols preferably have a hydroxy value of at least 140 mg KOH/g. Preferably the polyester polyol is an adipate polyester based polyol.

The amine applied in the synthesis of the polyurethane resin of the present invention is selected from those having an average molecular weight in the range of 60 to 400 g/mol. Preferably the amine is a diamine. The diamine is preferably selected from the group of 1.3 bis (amino ethyl) cyclohexane, m-xylene diamine or isophorone diamine. Isophorone diamine (IPDA) influences the initial adhesion of coatings to some kind of plastic substrates favourably.

The terminating agents are selected from the group consisting of monoethanol amines such as mono-, di-, triethanolamine, ethanol, n-propanol, isopropanol, 1,4- butandiol.

According to another preferred embodiment according to the present invention, further to the above mentioned compounds the group of isocyanate reactive compounds to be reacted with the diisocyanate also comprises a high molecular weight polyol compound having an average molecular weight in the range of 11000 to 18000 g/mol and even more preferably 12000 to 16000 g/mol. Preferably, such high molecular weight polyols are selected from the group consisting of dihydroxy polyether polyols such as polypropylene glycol.

A particularly preferred polyurethane resin is the reaction product of a diisocyanate such as a 1:1 mixture of IPDI and MDI with isocyanate-reactive compounds comprising a polytetrahydrofurane (poly(THF)) having an average molecular weight of 1000 g/mol, a co-polymer of ethylene oxide and propylene oxide having an average molecular weight of around 4000 g/mol and an ethylene oxide content of around 12% by weight, a hydrophilic polyether polyol component, 1,4-butanediol and polyethylene glycol having an average molecular weight of 400 g/mol as low molecular weight polyols, and one or more amine compounds such as IPDA and monoethanolamine.

The polyurethane resin according to the present invention can by synthesized by first reacting a mixture comprising: a first group of one or more polyether polyols each having an average molecular weight in the range of 1000 to 10000 g/mol, a second group of one or more polyols each having an average molecular weight of equal or less than 800 g/mol, with at least one diisocyanate to an isocyanate terminated prepolymer, and in a second step reacting the isocyanate terminated prepolymer with at least one diamine, and in a third step reacting the product obtained according to step b) with a third group of one or more polyether polyols each having an average molecular weight in the range of 400 to 10000 g/mol and being hydrophilic and/or water-soluble, and in a fourth step reacting the product obtained according to step c) with a terminating agent to a saturated polyurethane resin.

"Saturated" in this context means that the polyurethane resin has essentially no free unreacted isocyanates left.

The conditions under which the starting materials are reacted with each other are the standard methods for synthesizing polyurethane resins and are commonly known to the man skilled in the art.

However, it has turned out to be favorable to produce the polyurethane resins of the present invention in the above sequence of steps. If a polyol component having a high molecular weight of above 10000 g/mol is additionally used, such polyol component is preferably added within the first step of the above sequence.

A further part of the present invention is a coating composition comprising an organic solvent and the polyurethane resin of the present invention as at least one of the film forming binders. In a preferred embodiment the coating composition is a printing ink for printing plastic substrates and for the production of printed laminates. In both the coating composition and the printing ink, the polyurethane resin can be applied as the sole film forming binder.

The solvent is selected from the group of polar organic solvents, preferably from the group of alcohols and esters.

The polyurethane resin allows the printing ink to be easily adjusted to the needs of flexographic and gravure printing. Such an ink is soluble in alcohols, e.g. in ethanol, has a low viscosity, thus is thinly liquid, with a viscosity measured preferably of 30 to 100 seconds in a Cup 4 at 23° C. or 80 to 350 mPa·s at 23° C.

Depending on the chemical structure of the polyurethane resin and thus on the chemical nature of the reactands and their respective ratios to each other the printing inks are adjustable to the needs of different kinds of plastic substrates and/or application methods.

In the context of the present invention the following definitions are given:

The molecular weights are expressed as weight average molecular weights.

The average molecular weight of sum of the polyols of the first, second, and third group is calculated $$\sum_{i,x=1}^{i,x=3} (Mw_{ix} \cdot w_{ix})$$

where $Mw_{ix}$ is the molecular weight of polyol i in group x, wherein x=1–3 and $w_{ix}$ is the mol fraction of polyol i in group x, wherein x=1–3

The term "film forming" is defined according to DIN 55945: 1996-09. Film forming is the generic term for the transition of a coating layer from the liquid to the solid state. Film forming occurs by means of physical drying and/or curing. Both processes proceed simultaneously or one after the other. The polyurethane resin of the present invention is film forming under standard conditions (25° C., minimum 40% relative humidity). Whereas the term "drying" is more related to the process engineering used for drying the liquid layer, such as ovens and temperatures, the term "curing" is related to the chemical processes within the resin during the drying process. The polyurethane of the present invention is of the non-crosslinking type.

"Initial adhesion" is defined as being the adhesion immediately after drying and up to 30 seconds maximum after drying of the layer.

"Drying" means substantial removal of the solvent from the layer. The latter is one of the requirement that the layer becomes solid. The residual solvent in the layer is not more than 10% by weight of the weight of the overal solvent. A dried layer is a layer of a thickness between 4 and 6 μm in particular 5 μm after treatment in an IR-oven by 70–80° C. for less than one minute. In the solid state the layer is tack-free. In case the layer is thicker or thinner either the oven temperature has to be increased/decreased or the duration of heat treatment has to be adapted correspondingly.

"Layer" and "image" are used synonymously and interchangeably throughout the specification. Layers and images are in form of pictures, writings, overprints, (overprint varnishes) and their meaning should not be limited by their form, extension and thickness.

In the context of the present invention all technical terms shall be defined according to Römpp Lexikon, ed. U. Zoll, Georg Thieme Verlag Stuttgart, 1998.

The present invention further encompasses a method of producing a laminate carrying a printed image, the method comprises the step of providing a printing ink comprising at least one organic solvent and at least one polyurethane resin of the present invention as at least one film forming binder and applying a layer to a first substrate by printing the printing ink provided in step (a) in a flexographic and/or gravure printing process to the first substrate removing the solvent from the layer applied in step (b) thereby drying and/or curing the layer applying an adhesive to the layer of step (c) and finishing the laminate by applying a second substrate on the adhesive.

Preferably, the first and the second substrates are of a plastic material, preferably of polyolefinic nature. The first and the second substrate can also be of different chemical nature like polyester or polyamide such as Nylon.

According to the present invention, as an adhesive in this process can be used any conventional solvent-free adhesive or solvent-based adhesive.

The adhesives are applied to the layer according to conventional methods, for example by using a hand coater. Alcohol-based adhesives are preferably diluted with a conventional diluent before application. Preferably, a solution containing 20% by weight to 80% by weight, more preferably 30% by weight to 60% by weight of the adhesive is prepared hereby.

In the case of those adhesives, it is preferred according to the present invention to apply the adhesive to the printed layer of a substrate, and then to finish the laminate by applying a second substrate on the adhesive. In the case of a solvent-free adhesive, however, it is more preferred to apply the adhesive to an unprinted layer of a substrate, and then to finish the laminate by applying the printed layer of a second substrate to the adhesive.

Further part of the present invention is therefore a laminate produced by the method mentioned hereinbefore. Of course, the laminate can also be produced by extruding the second substrate on the first substrate carrying the dried layer. This method does not call for an adhesive.

If necessary, the ink composition of the present invention can contain additional binder resins, e.g. cellulosic resins, acrylic resins, polyvinyl chloride.

The present invention will be described in more detail by the following examples. Unless otherwise indicated, all percentages are % by weight. "Eq" stands for equivalents.

DESCRIPTION OF THE PREFERRED EMBODIMENT(S)

General Synthesis of the Polyurethane Resin

A five-neck flask equipped with two additions funnels, a gas introduction means, an agitator and a thermometer was charged with a mixture of 200 g ethyl acetate and 0.06% Irganox 1076. The mixture was thermostated at 25° C. at an agitation velocity of 60 rpm and an nitrogen stream of 0.4 m3/h. The temperature was increased to 60° C. and a mixture of 12.4 g IPDI, 13.5 g of Desmodur 2460M (MDI) and 0.04% DBTDL (dibutyltindilaurate, catalyst) diluted in 0.04% ethyl acetate was added to the flask. The agitation velocity was increased to 90 rpm. To the isocyanate solution a mixture of 110 g Pluronic 9200 (a liquid copolymer of ethylene oxide and propylene oxide having a molecular weight of around 3650 and an ethylene oxide content of 20%, manufactured by BASF), 3.3 g Polyglycol 2000 (a polyethylene oxide manufactured by Clariant), and 18,3 g Acclaim 12200 was added over a period of 10 minutes. The reaction was conducted by a temperature of 74° C. for 180 minutes. In the second-step a mixture of 4 g PPG 400 and 0,8 g 1.4 butane diol was slowly added to the prepolymer solution of the first step, the reaction was conducted for 30 minutes before adding in a third step 4.76 g isophorone diamine at an agitation velocity of 120 rpm. The reaction was conducted for another 15 minutes. In a fourth step 8,3 g Polyol TP200 (ethoxylated trimethylolpropane manufactured by Perstorp) was added to the prepolymer solution obtained in the third step to further increase the molecular weight of the prepolymer. After a reaction time of 120–180 minutes 20 g of ethanol as the fifth and last step.

The NCO-values are determined after each step and the increase in molecular weight of the polyurethane during synthesis is observed by GPC measurements (Waters 410 and 510; column Lichrogel PS 4000/40/20, calibration Polystyrene: 580-2200-5100-11600-30300-68000 -127000-330000).

Specification of the Polyurethane:

| Ingredient | Eq | % by weight |
|---|---|---|
| Ethyl Acetate | | 50.00 |
| MDI | 1.5 | |
| IPDI | 1.5 | |
| Stabilizer: Irganox 1076 | | 0.06 |
| Catalyst: DBTDL | | 0.04 |
| Pluronic 9200 | 0.951 | |
| Polyglycol 2000 | 0.05 | |
| Acclaim 12200 | 0.049 | |

-continued

| Ingredient | Eq | % by weight |
|---|---|---|
| PPG400 | 0.28 | |
| 1,4-butane diol | 0.27 | |
| IPDA | 0.84 | |
| TP200 | 0.59 | |
| Ethanol | | 5.00 |

Mn: 7000
Mw: 25000
Mz: 35000
Solid content: 45%
Viscosity: 3000 mPa · s at 25° C.

Method of Measurement the Initial Adhesion:

A self adhesive tape (10 cm, type 683 of 3M) is applied under uniform pressure onto a printed layer immediately after drying of the layer and torn off the substrate immediately thereafter. The quantity of the print adhered to the tape is classified on a scale from 0 to 5 wherein 0 means more than 95% of the printed layer adhered to the tape, 1 means more than 50% of the printed layer adhered to the tape, 2 means less than 30% of the printed layer adhered to the tape; 3 means less than 20% of the printed layer adhered to the tape, 4 means less than 10% of the printed layer adhered to the tape and 5 is less than 2% of the printed layer adhered to the tape. The test results are executed additionally in dependence of the drying time of the printed layer.

Formulation of Printing Ink Comprising the Polyurethane Resins According to the Present Invention A letdown varnish was prepared by mixing the following ingredients for 20 minutes:

| | |
|---|---|
| Polyurethane binder | 68 parts |
| Alcohol | 11 parts |
| Additives (such as waxes, resin, solvent) | balance |

The final ink was prepared by mixing the following ingredients during 20 minutes:

| WHITE/WHITE INK | |
|---|---|
| White pigment (TiO$_2$) | 33 parts |
| n-propanol | 7 parts |
| ethanol (dehydrated) | 17 parts |
| Isopropyl acetate | 5 parts |
| Additives | 7 parts |
| Wax | 2 parts |
| Polyurethane resin | 29 parts |

A cyan ink was prepared in a manner similar to the white ink, but using a cyan pigment instead of a white pigment.

Initial adhesion, heat resistance and laminations/delainination strength are tested on substrates of different chemical nature and are compared to the corresponding results of a printing ink formulated from a polyurethane resin which was synthesized without a hydrophilic, water-soluble polyol component.

The following substrates were used:

| Product name | Chemical nature | Producer |
| --- | --- | --- |
| MB 400 | coextruded bi-oriented polypropylene | Mobil |
| PE ld | low density polyethylene | Dow |

The initial adhesion and heat resistance are tested on the basis of a layer of the printing ink to an underlying substrate. For the lamination/delamination test the bond strength is tested on the basis of a layer of the printing ink between two plastic films.

Tested are: a print of the white ink as the only layer between the two plastic films, (indicated as white), a print of the cyan ink as the only layer between the two films (indicated as cyan) and a superposition of a layer of the cyan and white ink between the two films (indicated as 200%).

The technique for the production of the laminate is the adhesive based lamination technique. A printed sample of laminate having a width of 15 mm is placed between two jaws of a (dynamometer type Lhomargy). The sample is drawn out and the substrate separated from the counter-substrate. The bond strength (g/15 mm) and the delamination aspect of the tested laminate is evaluated at a speed of 200 mm/min. The bond strength is expressed as a combination of number value and letters. The number value stands for grams needed to separate the laminate of a width of 15 mm and a dynamometer speed of 200 mm/min. The higher the value the greater the bond strength. The letters indicate the kind of breakage with regard to the layer of the printing ink:

T: Transfer of 100% of the ink layer (from the substrate to the counter substrate).
P: Splitting of the ink layer (between substrate and counter substrate).
Z: No stable value for the bond strength.
R: Break/tear of one of the two films of the laminate.

The invention claimed is:

1. A polyurethane resin being the reaction product of at least one diisocyanate and a group of components having isocyanate reactive functional groups, said group of components comprising:
   a) a first group of one or more polyether polyols each having an average molecular weight in the range of between 1000 to 10000 g/mol,
   b) a second group of one or more polyether polyols each having an average molecular weight in the range of between 400 to 10000 g/mol and being hydrophilic and/or water-soluble,
   c) a third group of one or more polyols each having an average molecular weight of equal or less than 800 g/mol. and
   d) at least one amine and a reaction terminating agent, wherein the ratio of the number of equivalent weights of the diisocyanate to the components having isocyanate reactive functional groups is selected such that essentially all of the isocyanate groups of the diisocyanate are present as the reaction product with one of said isocyanate reactive functional groups.

2. A polyurethane resin according to claim 1 wherein the ratio of the number of equivalent weights of the diisocyanate to the entirety of the polyether polyols of the first group to the third group is in a range of 3.6:1 to 1:1.

3. A polyurethane resin according to claim 1, wherein the ratio of the number of equivalent weights of the sum of the polyether polyols of the first group and of the second group to the polyols of the third group is in the range of 1:1 to 5:1.

4. A polyurethane resin according to claim 1, wherein the ratio of the number of equivalent weights of the diisocyanate to the amine is in a range of 3:1 to 6:1.

5. A polyurethane resin according to claim 1, wherein the polyether polyols of the first group are selected from the group consisting of dihydroxy and trihydroxy polyether polyols.

6. A polyurethane resin according to claim 5, wherein the dihydroxy polyether polyol is selected from the group consisting of polyoxyalkylene glycol and a caprolactone based polyether.

7. A polyurethane resin according to claim 6, wherein the polyoxyalkylene glycol is a polypropyleneglycol or a polytetrahydrofuran.

8. A polyurethane resin according to claim 1, wherein the polyether polyol of the second group is a polymer which bag a hydroxy value of 280 mg KOH/g for diols and less than 420 mg KOH/g for triols and less than 560 mg KOH/g for tetrols.

9. A polyurethane resin according to claim 1, wherein the polyether polyol of the second group is a polymer obtained from ethoxylating trimethylolpropane with ethylene oxide, wherein the mole ratio of trimethylolpropane to ethylene oxide is from 1:10 to 1:50.

10. A polyurethane resin according to claim 1, wherein the amine is a diamine.

11. A polyurethane resin according to claim 10, where the diamine is selected from the group consisting of isophoronediamine, m-xylene diamine, 1,3 bis (aminoethyl) cyclohexane, and mixtures thereof.

12. A polyurethane resin according to claim 1, wherein said group of components having isocyanate reactive groups further comprises a high molecular weight polyol compound having an average molecular weight in the range of 11000 to 18000 g/mol.

13. A polyurethane resin according to claim 12, wherein said high molecular weight polyols are selected from the group consisting of dihydroxy polyether polyols.

14. Process for preparing a polyurethane resin according to claim 1, said process comprising the steps of:
   first reacting a mixture comprising: a first group of one or more polyether polyols each having an average molecular weight in the range of 1000 to 10000 g/mol, a third group of one or more polyols each having an average molecular weight of equal or less than 800 g/mol, with at least one diisocyanate to an isocyanate terminated prepolymer, and
   in a second step reacting said isocyanate terminated prepolymer with at least one diamine, and
   in a third step reacting the product obtained according to step b) with a second group of one or more polyether polyols each having an average molecular weight in the range of 400 to 10000 g/mol and being hydrophilic and water-soluble, and in a fourth step reacting the product obtained according to step c) with a terminating agent to a saturated polyurethane resin.

15. A polyurethane resin obtained by the process according to claim 14.

16. A method of producing a laminate carrying a printed layer, said method comprising the steps of
   providing a coating composition according to claim 15,
   applying a layer to a first substrate by printing said printing ink of step a) in a flexographic and/or gravure printing process, removing said solvent from said layer thereby drying and/or curing said layer obtained in step b), applying an adhesive to the dried and/or cured layer obtained in step c) and producing the laminate by applying at least a second substrate on the adhesive.

17. A laminate produced by the method of claim 16.

18. A coating composition comprising a solvent and at least one polyurethane resin according to claim 1 as film forming binder.

* * * * *

UNITED STATES PATENT AND TRADEMARK OFFICE
CERTIFICATE OF CORRECTION

| | |
|---|---|
| PATENT NO. | : 7,067,607 B2 |
| APPLICATION NO. | : 10/382465 |
| DATED | : June 27, 2006 |
| INVENTOR(S) | : Eugene et al. |

It is certified that error appears in the above-identified patent and that said Letters Patent is hereby corrected as shown below:

On Title Page, col. 1 of the patent the inventor information should read:

-- (75) Inventors: Denis Eugene, La Roche sur Foron (FR);
Gilles Eisele, Fillinges (FR);
Gilles Catherin, Saint Genis Pouilly (FR) --

Signed and Sealed this

Fifteenth Day of August, 2006

JON W. DUDAS
*Director of the United States Patent and Trademark Office*